Sept. 10, 1929.   J. H. WOODS   1,727,386
BRAKE CYLINDER
Filed Aug. 21, 1926
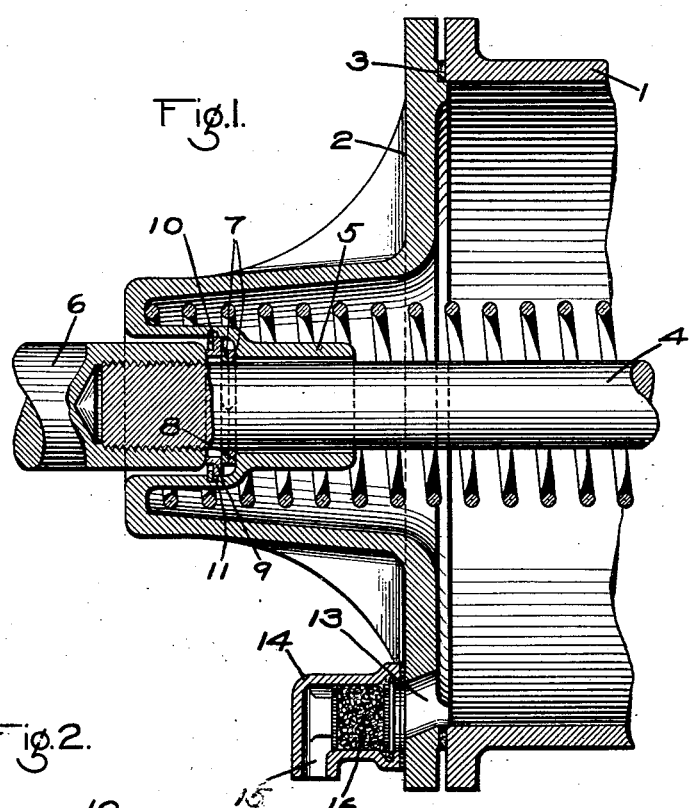
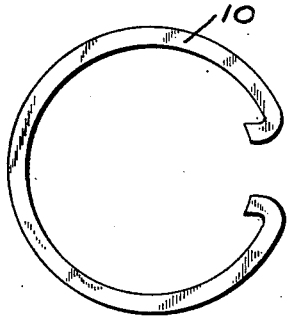
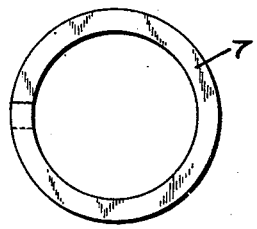
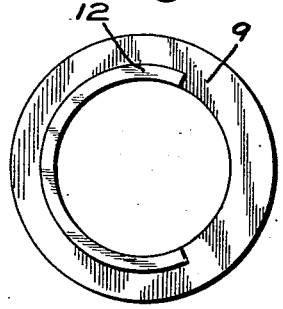
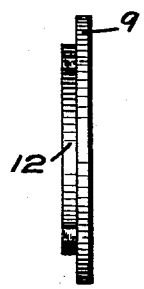
INVENTOR
JOHN H. WOODS
BY *Wm. M. Cady*
ATTORNEY Patented Sept. 10, 1929.

1,727,386

UNITED STATES PATENT OFFICE.

JOHN H. WOODS, OF HAMILTON, ONTARIO, CANADA, ASSIGNOR TO THE WESTINGHOUSE AIR BRAKE COMPANY, OF WILMERDING, PENNSYLVANIA, A CORPORATION OF PENNSYLVANIA.

BRAKE CYLINDER.

Application filed August 21, 1926. Serial No. 130,721.

This invention relates to brake cylinders, and has for its principal object to provide means for preventing water, snow, and dirt or other foreign matter from entering the non-pressure end of the brake cylinder.

In the accompanying drawing; Fig. 1 is a sectional view of the non-pressure end of a brake cylinder, showing my invention applied thereto; Fig. 2, an enlarged face view of the locking ring; Fig. 3, an enlarged face view of the retaining ring; Fig. 4 a side elevation of the retaining ring; and Fig. 5 an enlarged face view of one of the piston rod engaging rings.

As shown in the drawing, the brake cylinder 1 is provided with a non-pressure head 2 which is secured to the brake cylinder with an interposed packing ring 3, so as to prevent leakage into the non-pressure end of the brake cylinder past the non-pressure head.

The piston rod 4, which is connected to the usual brake cylinder piston (not shown) extends through a central opening in an inverted sleeve portion 5 of the head 2 and is secured to the brake operating member 6.

In order to prevent the entrance of air and consequently foreign material in the air from the atmosphere, around the piston rod 4 to the chamber at the non-pressure end of the brake cylinder, a pair of split rings 7, preferably of bronze, are applied to the piston rod 4, said rings having a neat sliding fit on the rod. The rings 7 are held against longitudinal movement by engagement of one ring with a shoulder 8 at the outer end of the sleeve portion 5 and the engagement of the other ring by a retaining ring or annulus 9. The annulus 9 is held in place by a locking ring 10, preferably of spring steel, which is adapted to be sprung into an annular recess 11 of the sleeve portion 5.

The ring 9 bears against the inner wall of the sleeve portion 5 and a clearance space is provided between the piston rod 4 and the ring, so that the rod is free to move laterally to the extent of the clearance space.

A flange 12, partly cut away, as shown in Fig. 3, is provided on the ring 9, so that when the piston rod 4 moves to its release position, the member 6 will engage said flange and ensure that the rings 7 are pressed firmly into their position engaging the shoulder 8.

Having provided means for making a tight joint to prevent flow of air to the non-pressure end of the brake cylinder both at the piston rod and at the joint between the pressure head and the brake cylinder, it is necessary to provide means for permitting flow of air to and from the non-pressure end of the brake cylinder as the brake cylinder piston moves back and forth. For this purpose, an opening 13 is provided through the non-pressure head 2 and a strainer device 14 is applied to said opening. Said strainer device has an atmospheric outlet 15 and contains a packing 16 of curled hair or other material for preventing the entrance of foreign matter into the non-pressure end of the brake cylinder, when air passes through the strainer from the atmosphere.

The rings 7 bearing against the shoulder 8 and against the piston rod 4 substantially prevent air from flowing from the atmosphere into the non-pressure end of the brake cylinder and consequently prevent the entrance with the air of any dirt, moisture, snow, or particles of foreign matter. The rings having a lateral clearance space surrounding same, lateral movement of the piston rod 4 relative to the pressure head 2 is permitted, while still maintaining a tight joint against leakage of air.

Having now described my invention, what I claim as new and desire to secure by Letters Patent, is:—

1. The combination with a brake cylinder having a nonpressure head and a piston rod extending through an opening in said head, of a pair of engaging metallic rings disposed in said head and having a snug sliding fit on said rod.

2. The combination with a brake cylinder having a nonpressure head and a piston rod extending through an opening in said head, of a pair of split rings disposed in said head and having a snug sliding fit on said rod.

3. The combination with a brake cylinder having a nonpressure head and a piston rod extending through an opening in said head, of a split ring having sliding engagement with said rod, and means associated with said head for holding said ring against longitudinal movement with respect to said rod.

4. The combination with a brake cylinder having a nonpressure head and a piston rod extending through an opening in said head, of a split ring having sliding engagement with said rod and free to move laterally with said rod with respect to said head, and means for preventing longitudinal movement of said ring with respect to said rod.

5. The combination with a brake cylinder having a nonpressure head and a piston rod extending through an opening in said head, of a piston rod packing ring in sliding engagement with said rod, a shoulder on the head for preventing longitudinal movement of the ring in one direction, a retaining ring for preventing longitudinal movement of the packing ring in the opposite direction, and means for locking said retaining ring in position.

6. The combination with a brake cylinder having a nonpressure head and a piston rod extending through an opening in said head, of a piston rod packing ring engaging said rod and surrounded laterally by a clearance space to permit lateral movement of said ring with said rod, and a retaining ring for holding said packing ring against longitudinal movement.

7. The combination with a brake cylinder having a nonpressure head and a piston rod extending through an opening in said head, of a piston rod packing ring engaging said rod and surrounded laterally by a clearance space to permit lateral movement of said ring with said rod, and a retaining ring for holding said packing ring against longitudinal movement and having a clearance space between the retaining ring and said rod to permit lateral movement of the rod with respect to the retaining ring.

8. The combination with a brake cylinder having a nonpressure head and a piston rod extending through an opening in said head, of a pair of piston rod packing rings in sliding engagement with said rod, a shoulder on said head laterally engaging one of said rings, a retaining ring laterally engaging the other packing ring, and means for locking said retaining ring in position.

9. The combination with a brake cylinder having a nonpressure head and a piston rod extending through an opening in said head, of a pair of piston rod packing rings in sliding engagement with said rod and free to move laterally with said rod and a retaining ring for preventing longitudinal movement of said packing rings with respect to said rod, said retaining ring having a clearance space between said rod and the retaining ring to permit lateral movement of said rod with respect to the retaining ring.

10. The combination with a brake cylinder having a nonpressure head and a piston rod extending through an opening in said head, of a piston rod packing ring in sliding engagement with said rod, a retaining ring for preventing longitudinal movement of said packing ring on said rod, and means associated with said rod for engaging said retaining ring upon movement of said rod to release position.

11. The combination with a brake cylinder having a nonpressure head and a piston rod extending through an opening in said head, of a pair of piston rod packing rings in sliding engagement with said rod and free to move laterally with said rod, a retaining ring for preventing longitudinal movement of said packing rings with respect to said rod, and a locking ring for holding said retaining ring in position.

12. The combination with a brake cylinder having a nonpressure head and a piston rod extending through an opening in said head, of means for preventing flow of air around the piston rod between the atmosphere and the chamber within the non-pressure head, and an air strainer disposed in an opening connecting the atmosphere with the chamber within the non-pressure head to permit flow of air between the atmosphere and said chamber, but preventing the entrance of foreign material from the atmosphere to said chamber.

In testimony whereof I have hereunto set my hand.

JOHN H. WOODS.